(12) United States Patent
Fahnestock

(10) Patent No.: US 10,691,741 B2
(45) Date of Patent: Jun. 23, 2020

(54) METHODS AND APPARATUS TO DETECT UNCONFINED VIEW MEDIA

(71) Applicant: The Nielsen Company (US), LLC, New York, NY (US)

(72) Inventor: Justin David Lee Fahnestock, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/498,177

(22) Filed: Apr. 26, 2017

(65) Prior Publication Data

US 2018/0315197 A1 Nov. 1, 2018

(51) Int. Cl.
| | |
|---|---|
| *G06F 16/44* | (2019.01) |
| *G06T 11/60* | (2006.01) |
| *G06F 16/48* | (2019.01) |
| *G06F 3/147* | (2006.01) |
| *G06F 3/14* | (2006.01) |

(52) U.S. Cl.
CPC .............. *G06F 16/444* (2019.01); *G06F 3/14* (2013.01); *G06F 3/147* (2013.01); *G06F 16/48* (2019.01); *G06T 11/60* (2013.01)

(58) Field of Classification Search
CPC ..... G06T 7/13; G06T 11/60; G06F 17/30038; G06F 17/30061; G06K 9/6202
See application file for complete search history.

(56) References Cited

U.S. PATENT DOCUMENTS

| | | | |
|---|---|---|---|
| 6,275,854 B1 | 8/2001 | Himmel et al. | |
| 7,162,054 B2* | 1/2007 | Meisner | G01S 5/16 348/169 |
| 10,395,117 B1* | 8/2019 | Zhang | G06K 9/4604 |
| 2010/0156907 A1 | 6/2010 | VanderSpek et al. | |
| 2012/0259578 A1 | 10/2012 | Bevilacqua et al. | |
| 2012/0265735 A1 | 10/2012 | McMillan et al. | |
| 2012/0281971 A1* | 11/2012 | Lin | G11B 27/005 386/284 |
| 2012/0314899 A1 | 12/2012 | Cohen et al. | |

(Continued)

FOREIGN PATENT DOCUMENTS

KR 20160074234 6/2016

OTHER PUBLICATIONS

International Searching Authority, "International Search Report and Written Opinion," issued in connection with International Patent Application No. PCT/US2018/028399, dated Aug. 9, 2018, 10 pages.

*Primary Examiner* — Pinalben Patel
(74) *Attorney, Agent, or Firm* — Hanley, Flight & Zimmerman, LLC

(57) ABSTRACT

Methods, apparatus, systems and articles of manufacture are disclosed to detect unconfined view media. A disclosed apparatus includes a pixel map generator to generate, by executing an instruction with a processor, a reference pixel map for media data; a field of view detector to detect, by executing an instruction with the processor, a field of view for a presentation of the media data; and a view edge determiner to determine, by executing an instruction with the processor, a first view edge based on the field of view and the reference pixel map and that the media data corresponds to unconfined view media based on the first view edge.

20 Claims, 11 Drawing Sheets

(56) References Cited

U.S. PATENT DOCUMENTS

| | | | |
|---|---|---|---|
| 2013/0342671 A1* | 12/2013 | Hummel | G06K 9/6202 |
| | | | 348/77 |
| 2014/0089107 A1* | 3/2014 | De Jager | G06Q 30/0277 |
| | | | 705/14.73 |
| 2016/0012855 A1 | 1/2016 | Krishnan | |
| 2016/0323618 A1 | 11/2016 | McMillan | |
| 2017/0104927 A1 | 4/2017 | Mugavero et al. | |

* cited by examiner

| | | | | | | |
|---|---|---|---|---|---|---|
| (126, 103, 205) | ( 96, 37, 205) | ( 85, 201, 165) | (149, 255, 107) | ( 24, 126, 203) | (187, 126, 106) | (207, 158, 255) |
| (138, 43, 226) | ( 10, 26, 92) | (230, 226, 0) | (207, 158, 255) | (148, 0, 211) | (230, 226, 0) | ( 10, 26, 92) |
| (155, 155, 155) | ( 34, 139, 34) | (138, 43, 226) | (233, 150, 122) | ( 34, 139, 34) | ( 85, 201, 165) | ( 11, 116, 96) |
| (148, 0, 211) | (207, 158, 255) | (148, 0, 211) | (138, 43, 226) | (155, 155, 155) | (148, 0, 211) | (155, 155, 155) |
| (141, 159, 205) | (148, 0, 211) | ( 26, 126, 92) | ( 85, 201, 165) | ( 85, 201, 165) | ( 34, 139, 34) | (138, 43, 226) |
| (138, 43, 226) | (233, 150, 122) | ( 85, 201, 165) | (230, 226, 0) | (155, 155, 165) | ( 10, 26, 92) | ( 10, 26, 92) |
| ( 10, 26, 92) | ( 0, 0, 0) | ( 34, 139, 34) | ( 10, 26, 26) | (233, 150, 122) | (138, 43, 226) | (230, 226, 0) |
| (207, 158, 255) | (138, 43, 255) | ( 85, 201, 165) | (177, 245, 39) | (138, 43, 226) | (207, 158, 255) | ( 12, 213, 89) |
| (230, 226, 0) | (255, 255, 0) | (155, 155, 155) | ( 10, 26, 92) | (148, 0, 211) | ( 34, 139, 34) | (138, 43, 226) |

PIXEL MAP — 402

FIELD OF VIEW

PIXEL MATCH

METHODS AND APPARATUS TO DETECT UNCONFINED VIEW MEDIA

FIELD OF THE DISCLOSURE

This disclosure relates generally to monitoring media and, more particularly, to methods and apparatus to detect unconfined view media.

BACKGROUND

In recent years, the presentation of media content (e.g., a video, an image) has evolved significantly. Specifically, media content is now capable of being viewed in an unconfined state (e.g., 360-degrees) on personal computers, mobile devices, smart televisions, and/or dedicated over-the-top (OTT) devices (e.g., Roku media devices, AppleTV media devices, GoogleTV media devices, FireTV media devices, etc.). In particular, unconfined media can be manipulated during presentation to view other areas separate from the field of view of the device (e.g., what is currently being displayed). For example, when viewing unconfined media on a computer, a mouse is used to pan around the media by clicking and dragging. Alternatively, smartphones use an internal sensor such as a gyroscope to pan the media based on the orientation of the device.

BRIEF DESCRIPTION OF THE DRAWINGS

FIGS. 4A and 4B are example representations of a pixel map and a field of view that may be generated using the example pixel map generator and Virtual Reality (VR) renderer of FIG. 2.

FIG. 9 is an example representation of a comparison between the pixel map and the field of view of FIGS. 4A and 4B that may be generated by the example pixel matcher of FIG. 3.

The figures are not to scale. Wherever possible, the same reference numbers will be used throughout the drawing(s) and accompanying written description to refer to the same or like parts.

DETAILED DESCRIPTION

Figure 1:
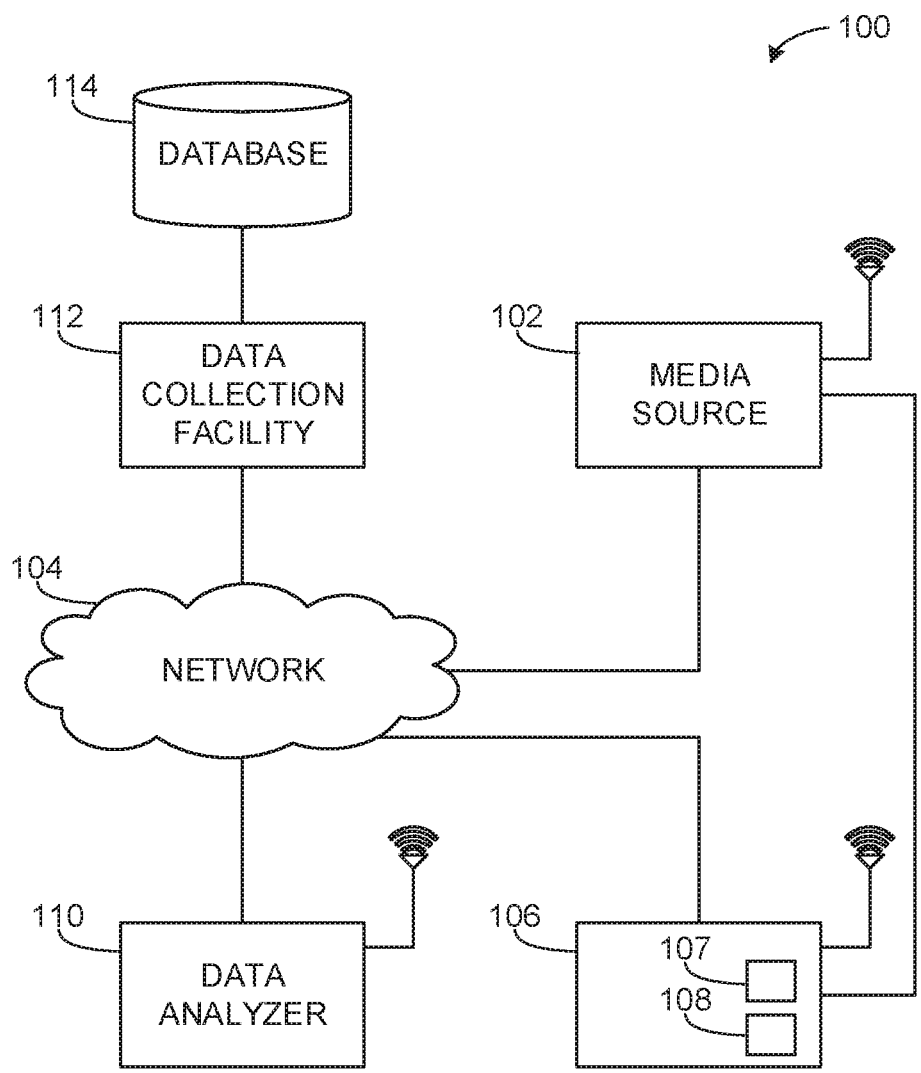
FIG. 1 illustrates an example media detection system in accordance with the teachings of this disclosure.

Methods and apparatus for detecting unconfined view media (e.g., 360-degree videos or images, etc.) are disclosed. The examples disclosed herein enable detection of unconfined view media by determining if a first view edge exceeds a threshold. An example method of detecting unconfined view media includes generating a reference pixel map for media data, detecting a field of view for a presentation of the media data, determining a first view edge based on the field of view and the reference pixel map, and determining that the media data corresponds to unconfined view media based on the first view edge. In some examples, a media decoder executed on a media device captures the media data from a media source, the media data includes metadata and pixel data. In some examples, the method includes processing the reference pixel map with a virtual reality renderer to generate a field of view for presentation. In some examples, detecting the field of view for the presentation of the media data includes detecting the field of view generated by the virtual reality renderer. In some examples, the method includes matching the pixels of the field of view to the pixels of the reference pixel map. In some examples, the method includes determining the first view edge from a border of the field of view subsequent identifying a match in the reference pixel map, and determining that the media data corresponds to unconfined view media when the first view edge exceeds a threshold. In some examples, the method includes generating media monitoring data based on the determination of unconfined view media and transmitting the media monitoring data to a collection facility.

An example apparatus for detecting unconfined view media, by executing instructions with a processor, includes a pixel map generator to generate a reference pixel map for media data, a field of view detector to detect a field of view for a presentation of the media data, and a view edge determiner to determine a first view edge based on the field of view and the reference pixel map and that the media data corresponds to unconfined view media based on the first view edge. In some examples, the pixel map generator captures the media data from a media source, the media data includes metadata and pixel data. In some examples, the apparatus includes a virtual reality renderer to process the reference pixel map to generate a field of view for presentation. In some examples, the field of view detector detects the field of view generated by the virtual reality renderer. In some examples, the apparatus includes a pixel matcher to match the pixels of the field of view to the pixels of the reference pixel map. In some examples, the view edge determiner determines the first view edge from a border of the field of view subsequent identifying a match in the reference pixel map, and determines that the media data corresponds to unconfined view media when the first view edge exceeds a threshold. In some examples, the apparatus includes a data analyzer to generate media monitoring data based on the determination of unconfined view media. In some examples, the data analyzer is to transmit the media monitoring data to a collection facility.

FIG. 1 illustrates an example media detection system 100 in accordance with the teachings of this disclosure. The system 100 includes a media source 102, a network 104, and a media presentation device 106. The media presentation device 106 includes, among other things, a media decoder 107 and a meter 108. The system 100 further includes a data analyzer 110, a data collection facility 112 and a database 114.

The example media source 102 is one or more media source(s) that supply media content to one or more presentation device(s) 106 via any distribution medium (e.g., cable, radio frequency, satellite, interne, physical media, etc.). Example media sources include Netflix®, YouTube®, Hulu®, the iTunes® Media Store, Napster™, Yahoo! Music™, Rhapsody™, etc. The example media source 102 may provide, for example, audio, video, image, text, and/or any combination thereof, in addition to identifying data associated with the provided media content. In some examples, no identifying data and/or inaccurate identifying data may be provided by the media source 102 or by another source. For example, the media source 102 may be a file transfer protocol (FTP) server provided by an individual that has (intentionally or unintentionally) mislabeled the media content. Accordingly, the identifying data (e.g., metadata) associated with media content stored on the presentation device(s) 106 may not always be trusted to be accurate. However, media content may include protections to ensure that identifying data remains accurate (e.g., is not altered by an end-user of external program(s)). For example, certain types of media content may include digital rights management (DRM) technology, copy protection, etc. that prevents metadata from being altered or indicates that the metadata has been altered.

In the illustrated example of FIG. 1, the media source 102, the presentation device 106, the data analyzer 110 and the data collection facility 112 are communicatively coupled via any type(s) of public and/or private IP networks 104. In the illustrated example, the network 104 is implemented by the Internet. However, any type(s) of past, current, and/or future communication network(s), communication system(s), communication device(s), transmission medium(s), protocol(s), technique(s), and/or standard(s) could be used to communicatively couple the components of FIG. 1 (e.g., the media source 102, the data analyzer 110). Further, the example components of the illustrated system 100 may be coupled to the network 104 via any type(s) of past, current, and/or future device(s), technology(ies), and/or method(s), including voice-band modems(s), digital subscriber line (DSL) modem(s), cable modem(s), Ethernet transceiver(s), optical transceiver(s), virtual private network (VPN) connection(s), Institute of Electrical and Electronics Engineers (IEEE) 802.11x (a.k.a. WiFi) transceiver(s), IEEE 802.16 (a.k.a. WiMax), access point(s), access provider network(s), etc. Further, the network 104 may be implemented by one or a combination(s) of any hardwire network, any wireless network, any hybrid hardwire and wireless network, a local area network, a wide area network, a mobile device network, a peer-to-peer network, etc. For example, a first network may connect the media source 102 to the presentation device 106, a second network may connect the presentation device 106 to the data analyzer 110, while a third network may connect the data analyzer 110 to the data collection facility 112. Further, while the example database 114 is shown as connected directly to the example data collection facility 112, in some implementations, the database 114 may be connected to the data collection facility 112 via the network 104 or via a second network (not shown).

The presentation device 106 is capable of receiving media content from the media source 102. In addition, the presentation device 106 may receive media content locally. For example, the presentation device 106 may download audio and/or video content from one or more media source(s) 102 and/or may receive audio and/or video content that is downloaded from CDs, DVDs, memory cards, etc. that are inserted in the presentation device(s) 106 by the owner(s)/operator(s) of the presentation device(s) 106.

The presentation device 106 may be any type of device capable of presenting and/or storing media content. For example, the presentation device 106 may be implemented by a television, a personal computer, a laptop computer, a media center computer, a digital video recorder, a mobile computer device, a console gaming system, a portable video/audio player, a removable media player (e.g., a digital versatile disk (DVD) player/recorder), a set top box (STB), a tablet computer, a cell phone, a portable gaming device, a video cassette recorder/player, and/or any other type of presentation device and/or storage medium (e.g., a hard disc drive, compact disc (CD), digital versatile disk (DVD), flash memory, random access memory (RAM), etc.).

To collect media data to determine if media is unconfined or confined, the example presentation device 106 includes a media decoder 107 and a meter 108, which are described in greater detail below in connection with FIGS. 2 and 3. Alternatively, the media decoder 107 and the meter 108 may be separate from the presentation device 106. For example, the media decoder 107 and/or the meter 108 may be a separate device connected to the media source 102. In the illustrated example of FIG. 1, owner(s) and/or household(s) associated with the presentation device 106 have been selected (e.g., statistically or randomly) and/or volunteered to participate in a monitoring panel. In particular, the owners/operators of the example presentation device 106 have agreed to participate in the monitoring panel and to have the media content on their respective presentation device(s) 106 monitored by, for example, a media consumption metering entity. For example, where the presentation device(s) 106 is implemented by personal computers, the time, duration, and/or visited Internet protocol (IP) addresses of web-browser sessions may be monitored and reported (e.g., to a database). In such instances, the meter 108 may be integrated (e.g., via a download over the Internet or installed by a manufacturer) into existing monitoring software on the presentation device(s) 106.

Additionally or alternatively, the participants have agreed to permit the audience measurement entity to collect media data from their library(ies) of media content. Additionally or alternatively, media data may be collected from presentation devices associated with person(s) who are not participants of the monitoring panel (e.g., anonymously). For example, the meter 108 may be downloaded (e.g., via the Internet or removable media, such as a CD) and/or installed on one or more presentation devices of any consenting party or entity. This consent may be made with or without an exchange of consideration. In some examples, the meter 108 may be bundled with other software applications to encourage users to download and execute the meter 108. Further, in some examples, monitoring may be performed without the consent of the owners/operators of certain presentation devices when such consent is not required. Thus, media data may be collected (e.g., via the meter 108) from the presentation device 106 of members of a media consumption monitoring panel, non-members of the panel, and/or any combination thereof.

Generally, the example media decoder 107 collects media data from any media stored/received at the presentation device 106 to decode the media data and process it for presentation at the presentation device 106. The meter 108 to collect the decoded media data from the media decoder 107 to detect unconfined view media (e.g., 360-degree view media). The meter 108 sends the detected data (e.g., a set or subset of the data) to the data analyzer 110, either directly or via the network 104. In the illustrated example of FIG. 1, the media data sent to the data analyzer 110 explicitly identifies the media content as unconfined or confined view media. The data analyzer 110 collects media data from the meter 108 to generate media monitoring data for the media content (e.g., metadata identifying attributes of the media content including, for example, the file name of the media content, the format of the media content (e.g. mp3, wmv, etc.), the type of the media content, the artist(s), the copyright holder (s), any program identification codes present in the media, one or more signatures or set(s) of signature(s), metadata, etc.) and sends the media monitoring data to the data collection facility 112. Media monitoring data is data that may be used to identify media content associated therewith in the absence of identifying data (e.g., by comparing a first signature from a first (unknown) media file to a second signature from a second (known) media file, it may be determined that the media content of the first and second media files are the same when the first signature substantially matches the second signature).

The example media decoder 107 is configured to decode media data received at the example presentation device 106. When media data received via the media source 102 is encoded and/or encrypted, the example media decoder 107 decodes and/or decrypts the media data into, for example, a form suitable for output to the presentation device 106. Example outputs to the presentation device 106 include, but are not limited to, an RF output module, a component video output module, and/or a high-definition multimedia interface (HDMI) module. Further, the example media decoder 107, may be implemented by hardware, software, firmware and/or any combination thereof. The media decoder 107 and these processes are described below in greater detail in connection with FIG. 2.

The example meter 108 of FIG. 1 is capable of automatically locating media content on the presentation device 106 on which the meter 108 is installed. Further, the meter 108 may be capable of collecting decoded media data from the media decoder 107. Additionally or alternatively, the meter 108 may be capable of monitoring media content playback, download, and/or streaming (e.g., from the Internet, from another computer, from a physical media, etc.) at the presentation device 106 on which the meter 108 is installed. The meter 108 and these processes are described below in greater detail in connection with FIG. 3. While one presentation device 106 is illustrated in the example system 100 of FIG. 1, any number of presentation devices may be provided to implement the collection and/or generation of media data described herein. In addition, other presentation devices that are not monitored (e.g., do not include the meter 108) may be connected to the network 104.

In view of the foregoing, the example system 100 is used to determine unconfined or confined view media. As described below in connection with FIGS. 2, 3, 4 and 5, the example system 100 utilizes the media decoder 107 and the meter 108 installed or attached on the presentation device 106 to collect media data from the media source 102 transmitted to the presentation device 106 for presentation. Specifically, the media decoder 107 generates a pixel map from the collected media data and processes the pixel map to determine a field of view for presentation at the presentation device 106. The meter 108 collects the pixel map and field of view of the media decoder 107 and compares the pixel map and the field of view to determine a view edge to identify unconfined or confined view media. Further, in this example, the meter 108 sends the identification of unconfined or confined view media to the data analyzer 110, the data analyzer 110 generates media monitoring data for the media data and transmits the media monitoring data to the collection facility 112 for storage in the database 114.

The example data analyzer 110 is communicatively coupled to the presentation device 106 and the data collection facility 112 and analyzes identifying data associated with media content (e.g., as detected by the meter 108 and/or as obtained from other source(s)). The data analyzer 110 may be any type of device or memory capable of storing, analyzing and transmitting the identifying data as described herein. Although only one data analyzer 110 is shown in FIG. 1, multiple data analyzers may be provided. Further, the example data analyzer 110 may include multiple memories, and/or other storage devices to maintain and provide access to collected data.

The example data collection facility 112 is any facility or server capable of receiving and storing media monitoring data provided by, for example, the data analyzer 110 and/or the meter 108 installed on the presentation device(s) 106. Further, the example data collection facility 112 facilitates storage and retrieval of media monitoring data in/from the database 114. In the illustrated example, the data collection facility 112 is implemented by an audience metering facility that tracks the identification of unconfined or confined view media. While a single data collection facility 112 is shown in the example system 100 of FIG. 1, multiple data collection facilitates may be implemented in some implementations.

The example database 114 is communicatively coupled to the data collection facility 112 and comprises a database that stores media monitoring data associated with media content (e.g., as detected by the meter 108 and/or as obtained from other source(s)). The database 114 may be any type of device or memory capable of storing the identifying data and reference data described herein. Although only one database 114 is shown in FIG. 1, multiple databases (or storage devices or memory) may be provided. Further, the example database 114 may include multiple databases, memories, and/or other storage devices to maintain and provide access to collected data.

Figure 2:
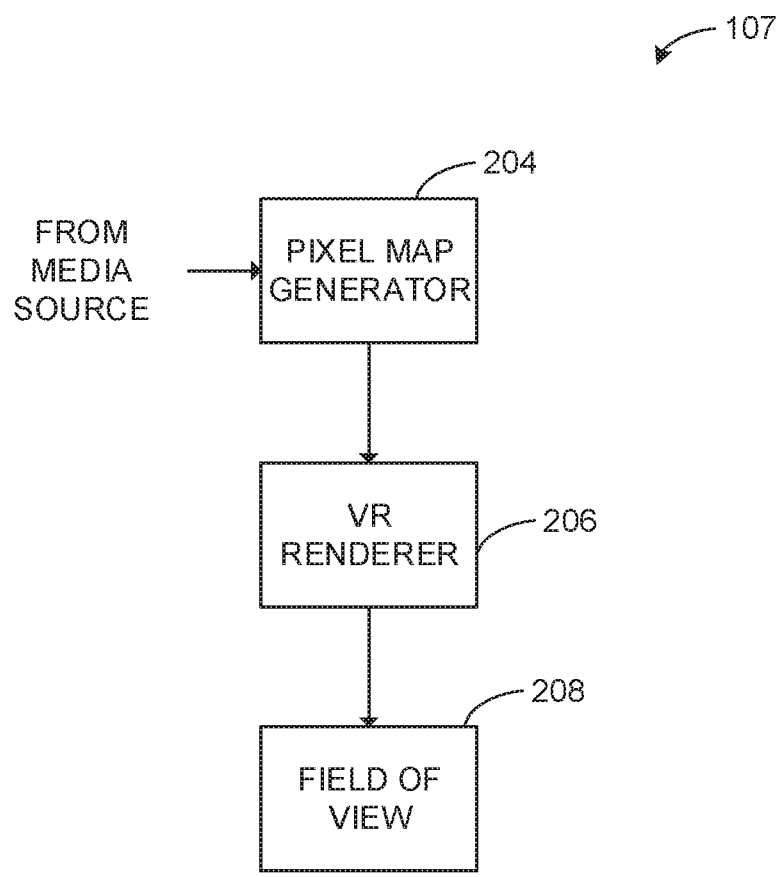
FIG. 2 illustrates an example media decoder of FIG. 1 that may be implemented with the examples disclosed herein.

FIG. 2 is a block diagram of an example implementation of the media decoder 107 of FIG. 1. The example media decoder 107 includes a pixel map generator 204, a VR renderer 206, and a field of view 208. For ease of description, the following will discuss an implementation in which the media decoder 107 is installed in the presentation device 106. However, one or more version(s) of the media decoder 107 may be additionally or alternatively installed on the presentation device(s) 106, and/or on any other device capable of presenting and/or storing media content.

The example pixel map generator 204 of FIG. 2 receives and/or identifies (e.g., via a search, via an API call, etc.) media content stored on or accessible by the presentation device 106. In the illustrated example, the pixel map generator 204 monitors media applications executing on the presentation device 106. For example, the pixel map generator 204 may be a plug-in installed in Microsoft's Windows® Media Player, may monitor YouTube® software using a program interface to YouTube®, etc. In the illustrated example, the pixel map generator 204 searches for and/or locates media content on the presentation device 106 regardless of whether the media content is currently being presented or has ever been presented on the presentation device 106. In the illustrated example, the pixel map generator 204 searches through a directory structure of memory (e.g., a hard disk, an external memory, an attached media consumption device, such as an iPad®, etc.) connected to the presentation device 106, and/or monitors media content as it is downloaded to the presentation device 106 (e.g., media content downloaded from an external device, media content downloaded via a connected network, such as the network 104, etc.). Further, the pixel map generator 204 utilizes a combination of monitoring one or more media applications and locating media content on and/or accessible by the presentation device 106. While the foregoing describes several ways in which the pixel map generator 204 accesses media content available to the presentation device 106, any other method of locating such media content may be used.

The example pixel map generator 204 is configured to recognize the type (e.g., protected audio, unprotected audio, video depicted image, Windows media audio (WMA), etc.) of the media content (e.g., using metadata, using a file extension, etc.) and/or to recognize the state of the media content (e.g., media content that has been modified by an end user, media content that has not been modified, media content that has been created by an end user, etc.). The example pixel map generator 204 is also structured to exclude certain types of media content from (and/or to include content in certain state(s) in) the media data collection process. For example, the pixel map generator 204 of the illustrated example is configured to only accept media content that has not been modified or created by an end user to increase the likelihood that metadata associated with the media content is accurate. In some examples, the pixel map generator 204 may be configured to only accept media content that is identified as having been received from a source that has been determined to be reputable (e.g., a media content provider, such as the media source 102 of FIG. 1, may be considered reputable whereas a user-created file may be considered non-reputable). Further, the pixel map generator 204 may be configured to only accept media data whose metadata is protected (e.g., encrypted) so that it cannot be changed by end users. While the foregoing provides example methods for determining which media content should be accepted by the pixel map generator 204, any method may be used to maximize the likelihood that identifying data (e.g., metadata) and/or reference data (e.g., a code, series of codes, signature, series of signatures, etc.) associated with the media data is accurate and/or legally accessible.

The pixel map generator 204 of the illustrated example may receive an indication of the availability of located media data. For example, the pixel map generator 204 may receive a copy of the data access path by which the located media content may be retrieved by the pixel map generator 204, may receive a link to the media content to the pixel map generator 204, may receive a copy of the media content, etc.

The example pixel map generator 204 extracts identifying data from and/or associated with the media content located or identified by the example pixel map generator 204. To obtain identifying information, the pixel map generator 204 may utilize any available method for locating, for example, metadata identifying one or more attributes (e.g., unconfined media, a pixel size, a pixel ratio, a display size, etc.) of the media content. For example, the pixel map generator 204 may extract metadata that is embedded or hidden in the media content itself, receive metadata from a media application (e.g., a media handler) that is processing or has processed the media content, retrieve metadata from a local or external database associated with the media content (e.g., a Netflix® library database), prompt the owner/operator of the presentation device 106 for identifying information associated with the media content, etc.

Figure 4B:
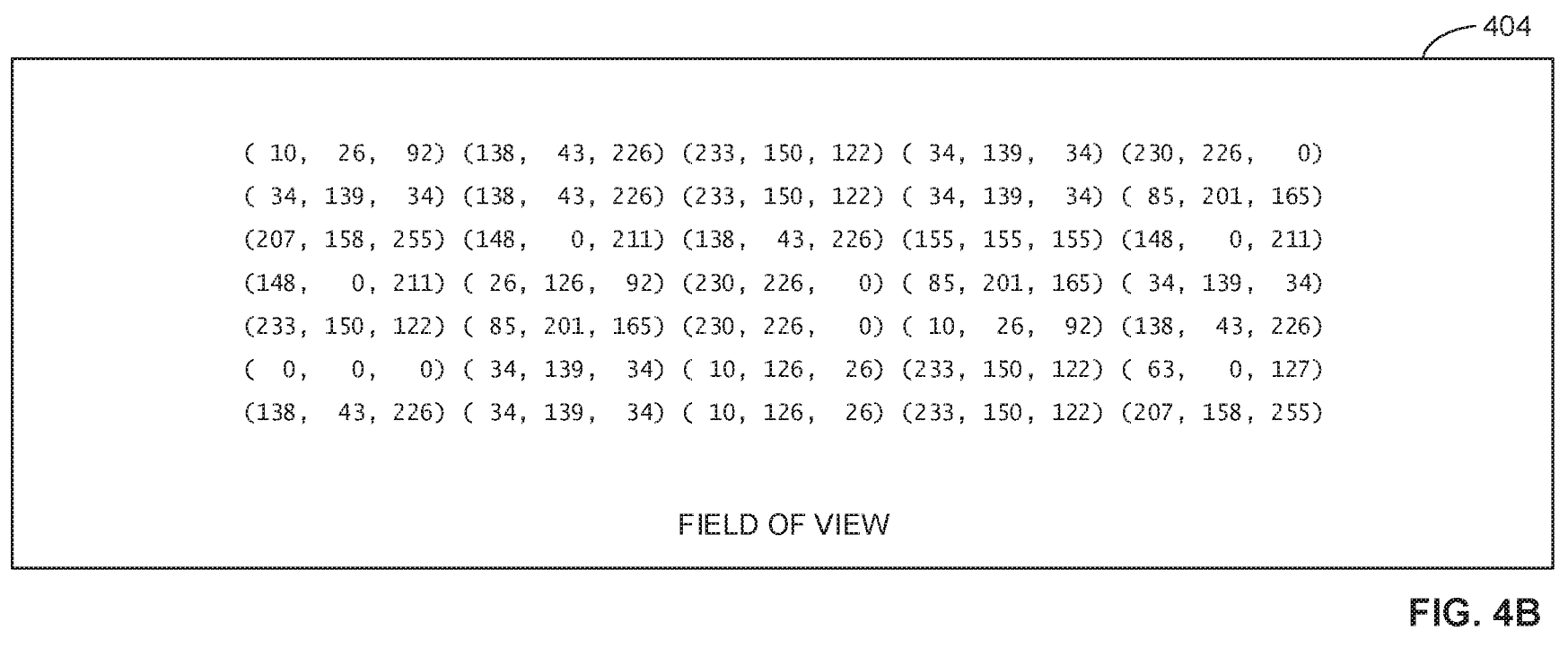

To generate a reference pixel map, the pixel map generator 204 extracts an image file (e.g., a Portable Pixel Map (.ppm), a Bitmap (.bmp), etc.) from the media data associated with the media content located or identified by the example pixel map generator 204, for example. The pixel map generator 204 may utilize the image file along with the attributes of the identifying data to map the pixels in an array. For example, the pixel map generator 204 maps pixels corresponding to locations of the presentation device 106. The pixel map generator 204 maps the locations of the presentation device 106 to an array of pixels based on rows and columns. Each pixel in the array is identified by its corresponding row and column, elements represented by a (Red, Green, Blue) value on the pixel map 402 as shown in FIG. 4A, represent distinct pixels. The array of pixels is generated such that each location of the presentation device 106 is represented by a pixel of the array. In this example, the resulting array of pixels is a pixel map, similar to the pixel map 402 of FIG. 4A. FIGS. 4A and 4B are example representations of the pixel map 402 and a field of view 404 that may be generated using the example pixel map generator 204 and VR renderer 206 of FIG. 2. The pixel map 402 illustrates media data from the media source 102 that has been generated by the pixel map generator 204. In contrast the pixel map 402, the field of view 404 illustrates a pixel map (e.g., the pixel map 402) that has been rendered for presentation at the presentation device 106 via the VR renderer 206, as described in further detail below. In some examples, the field of view 404 is the field of view 208.

The example VR renderer 206 receives the pixel map from the pixel map generator 204 for processing to determine the field of view 208 of the presentation device 106. Additionally, the example VR renderer 206 extracts identifying data from and/or associated with the media content located or identified by the example pixel map generator 204. To obtain identifying information, the VR renderer 206 may utilize any available method for locating, for example, metadata identifying one or more attributes (e.g., unconfined media, a pixel size, a pixel ratio, a display size, etc.) of the media content. For example, the VR renderer 206 may extract metadata that is embedded or hidden in the media content itself, receive metadata from a media application (e.g., a media handler) that is processing or has processed the media content, retrieve metadata from a local or external database associated with the media content (e.g., a Netflix® library database), prompt the owner/operator of the presentation device 106 for identifying information associated with the media content, etc. Alternatively, the pixel map generator 204 may provide the necessary identifying information that the VR renderer 206 may need for processing the pixel map.

To process to the pixel map for presentation at the presentation device 106, the VR renderer 206 manipulates the pixel map using the identifying information and display information for the presentation device 106 (e.g., display size, display ratio, etc.). For example, when the VR renderer 206 extracts identifying information indicating unconfined media, the VR renderer 206 will determine the display information and process the pixel map based on the display information and the identifying information using any virtual reality algorithm. In particular, the VR renderer 206 will detect each location of the presentation device 106 to be viewed using the display information and the identifying information, and may identify the pixel representing the detected location or the pixel to be displayed in that location based on the output of the virtual reality algorithm. For example, the VR renderer 206 may indicate locations of the display in a sequence indicated by the virtual reality algorithm. The VR renderer 206 will detect the indicated locations in order and identify the pixels corresponding to the indicated locations. The VR renderer 206 will store the identified pixels as elements of the field of view 208, e.g., the VR renderer 206 will store the coordinates corresponding to the pixels associated with the indicated locations, respectively.

When the VR renderer 206 determines that the entire pixel map has been processed, the VR renderer 206 retrieves the stored pixels and generates the field of view 208. For example, the VR renderer 206 retrieves the identified pixels and generates the field of view 208 corresponding to the indicated locations. Subsequently the YR renderer 206 may send the field of view 208 to the presentation device 106 and/or the meter 108 for display and/or further processing.

Figure 3:
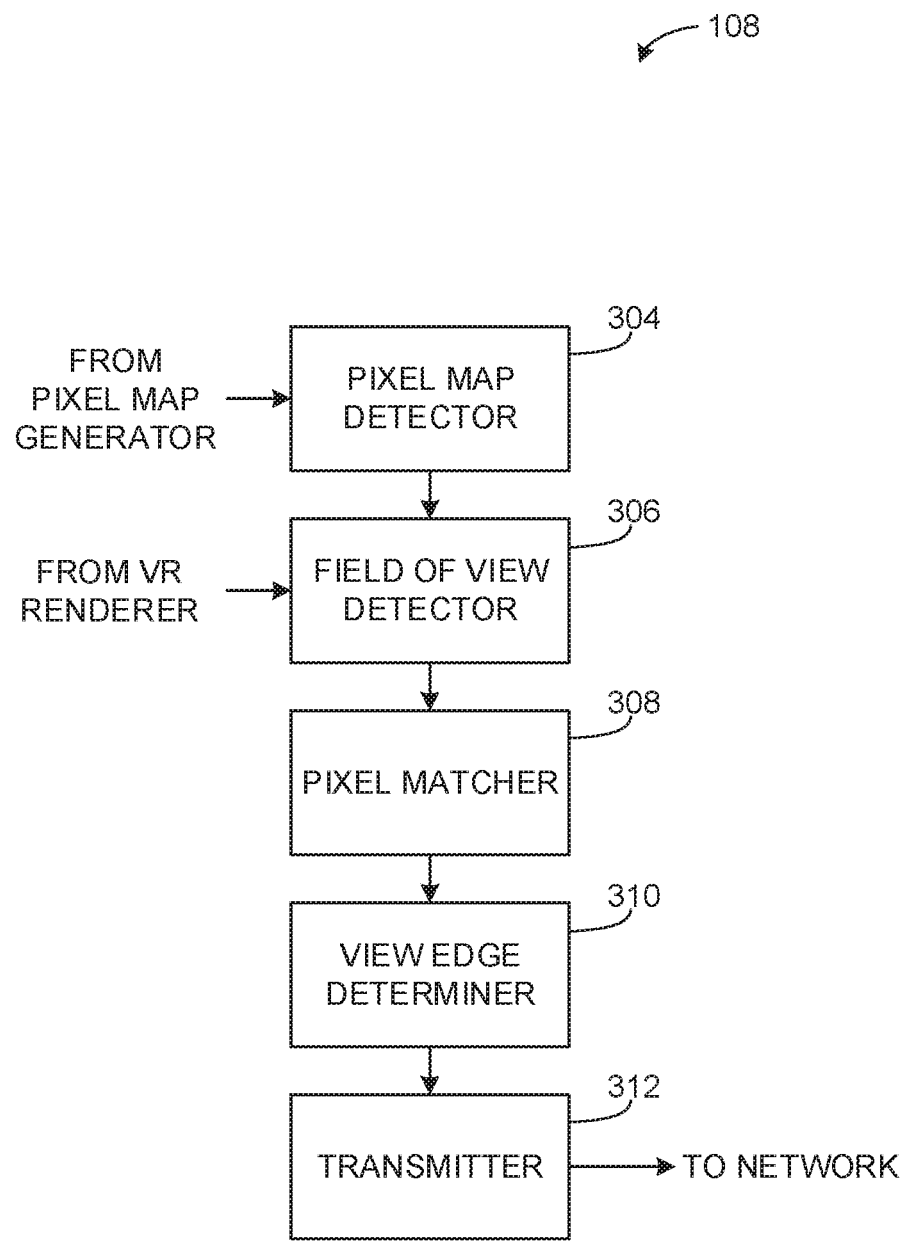
FIG. 3 illustrates an example meter of FIG. 1 that may be implemented with the examples disclosed herein.

FIG. 3 is a block diagram of an example implementation of the meter 108 of FIG. 1. The example meter 108 of FIG. 3 includes a pixel map detector 304, a field of view detector 306, a pixel matcher 308, a view edge determiner 310, and a transmitter 312. For ease of description, the following will discuss an implementation in which the meter 108 is installed in the presentation device 106. However, one or more version(s) of the meter 108 may be additionally or alternatively installed on the presentation device(s) 106, and/or on any other device capable of presenting and/or storing media content.

In the illustrated example, the pixel map detector 304 detects the pixel map generated by the pixel map generator 204. The field of view detector detects the field of view 208 generated by the VR renderer 206. The example pixel matcher 308 extracts the pixel map from the pixel map detector 304 and the field of view from the field of view detector 306, similar to the pixel map 402 and the field of view 404 of FIGS. 4A-4B. Subsequently, the pixel matcher 308 matches each pixel from the field of view (e.g., field of view 404 of FIG. 4B) to each pixel of the pixel map (e.g., the pixel map 402 of FIG. 4A). When a match is identified, the pixel matcher 308 marks the pixel on the pixel map that has been matched. When all the pixels have been matched, the pixel matcher 308 produces a pixel match (e.g., the pixel match 902 of FIG. 9) that is sent to the view edge determiner 310 for further analysis.

To determine if the media content is unconfined media or confined media, the view edge determiner 310 compares outer edges of the marked pixels of the pixel match to a threshold (e.g., a straight line). For example, the view edge determiner 310 may compare the top edge of the marked pixels to the threshold. If the top edge is a straight line, the view edge determiner 310 may indicate that the media is confined media. However, if the top edge is not a straight line (e.g., takes on a shape similar to the pixel match 902 of FIG. 9) the view edge determiner 310 may indicate the media is unconfined media. In some examples, the view edge determiner 310 may extract the shape of the marked pixels and compare it to a stored shape. For example, the view edge determiner 310 may extract the shape of the marked pixels, compare the shape to stored shapes, and determine that the shape is a rectangle representing confined media. In some examples, the view edge determiner 310 may determine that the shape is warped slightly, similar to the shape of the pixel match 902, representing unconfined media. The indication of unconfined or confined media is sent to the data analyzer 110 via the transmitter 312.

The example transmitter 312 provides an interface between the network 104, the data analyzer 110 and the meter 108. In the illustrated example, the transmitter 312 is provided by the meter 108 and is adapted to communicate with the network 104. For example, the transmitter 312 may be a wired network interface, a wireless network interface, a Bluetooth network interface, etc. and may include the associated software needed to facilitate communication between the meter 108 and the network 104. Additionally, the transmitter 312 may be adapted to communicate directly with a source(s).

The example data analyzer 110 conveys the indication of confined or unconfined media from the meter 108 along with the identifying information from the media decoder 107 to the collection facility 112 of FIG. 1, via the network 104, along with a query requesting that the collection facility 112 indicate whether reference data for the media content is already included at the collection facility 112 (e.g., stored in the database 114 of FIG. 1). If the collection facility 112 responds (e.g., via the network 104) with a message indicating that the reference data associated with the extracted identifying information has not been stored or is not validated (e.g., an insufficient number of presentation devices have sent matching reference data for the associated media content), the data analyzer 110 conveys the extracted identifying data to the collection facility 112 for storage in the database 114. Alternatively, the data analyzer 110 may not query the collection facility 112 and, rather, may send the identifying data after every indication. In other words, identifying information and reference data may be conveyed to the collection facility 112 without first querying the collection facility 112.

The example data analyzer 110 generates media monitoring data for media content identified as unconfined or confined media. As described above, the generated media monitoring data is data that may be used to identify the media content in the absence of reliable identifying information. For example, the media monitoring data may be a signature comprising a characteristic of the media content that can serve as a proxy for the complete content. Generally, the example data analyzer 110 may extract metadata from the media content, may generate one or more signatures of the media content, may recognize one or more watermarks (e.g., source or content identification codes or other data embedded in and/or otherwise associated with, the media content, etc. Preferably, the data analyzer 110 collects and/or generates all available type(s) of media monitoring data. Alternatively, if the collection facility 112 responds that only a certain type of media monitoring data is needed for that particular piece of content (e.g., a code), only that particular type of media monitoring data is sent (if available) to the collection facility 112. Any method of combining and/or associating the media data and the identifying data may be used. For example, the data analyzer 110 may combine the media data and the identifying information in a zip file, may associate the same index value with the media data and the identifying information, may send either one or both of the media data and the identifying information with a message indicating that they are associated with each other, etc.

While an example manner of implementing the media decoder 107 and the meter 108 of FIG. 1 is illustrated in FIGS. 2 and 3, one or more of the elements, processes and/or devices illustrated in FIGS. 2 and 3 may be combined, divided, re-arranged, omitted, eliminated and/or implemented in any other way. Further, the data analyzer 110, the pixel map generator 204, the VR renderer 206, the pixel map detector 304, the field of view detector 306, the pixel matcher 308, and the view edge determiner 310 of FIGS. 1, 2 and 3 may be implemented by hardware, software, firmware and/or any combination of hardware, software and/or firmware. Thus, for example, any of the example data analyzer 110, the example pixel map generator 204, the example VR renderer 206, the example pixel map detector 304, the example field of view detector 306, the example pixel matcher 308, and the example view edge determiner 310 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data analyzer 110, the example pixel map generator 204, the example VR renderer 206, the example pixel map detector 304, the example field of view detector 306, the example pixel matcher 308, and the example view edge determiner 310 is/are hereby expressly defined to include a tangible computer readable storage device or storage disk such as a memory, a digital versatile disk (DVD), a compact disk (CD), a Blu-ray disk, etc. storing the software and/or firmware. Further still, the example media decoder 107 and the example meter 108 of FIGS. 2 and 3 may include one or more elements, processes and/or devices in addition to, or instead of, those illustrated in FIGS. 2 and 3, and/or may include more than one of any or all of the illustrated elements, processes and devices.

A flowchart representative of example machine readable instructions for implementing the media decoder 107, the meter 108, and the data analyzer 110 of FIG. 1 is shown in FIGS. 5, 6, 7, and 8. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 5, many other methods of implementing the example media decoder 107, the example meter 108, and the example data analyzer 110 may alternatively be used. For example, the order of execution of the blocks may be changed, and/or some of the blocks described may be changed, eliminated, or combined.

As mentioned above, the example processes of FIGS. 5, 6, 7, and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6, 7, and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
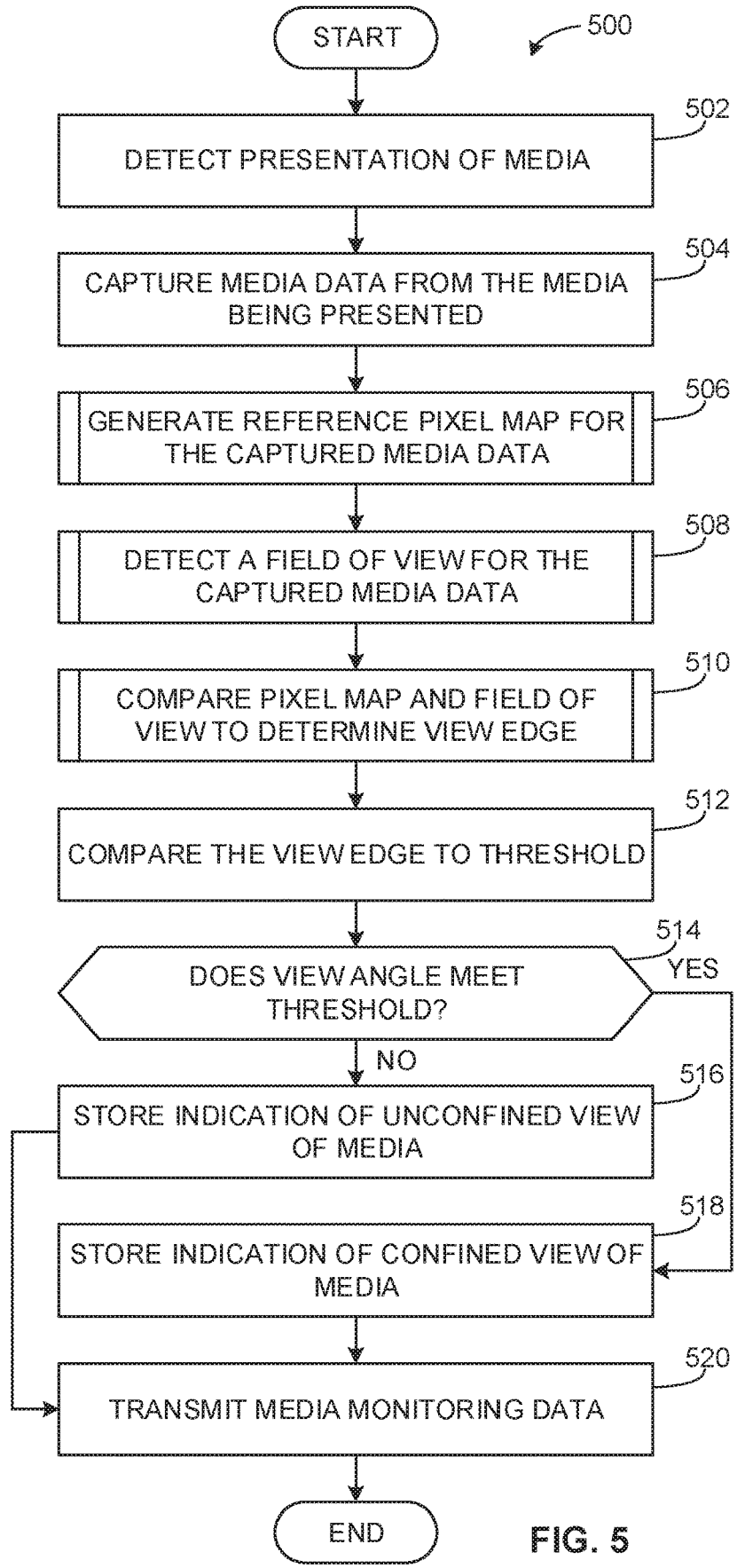
FIG. 5 is a flowchart representative of machine readable instructions that may be executed to implement the example media decoder, the example meter, and the example data analyzer of FIGS. 1, 2 and 3.

The program 500 of FIG. 5 begins at block 502 when the pixel map generator 204 detects presentation of media to the presentation device 106 from the media source 102 and/or detects the presentation device 106 requesting media from the media source 102 (e.g., an API call). When media is detected as being presented, the pixel map generator 204 captures media data from the media being presented (block 504). The media data collected may include, file type, image frames, pixel information, audio, display setting of the presented media, for example.

Figure 9:
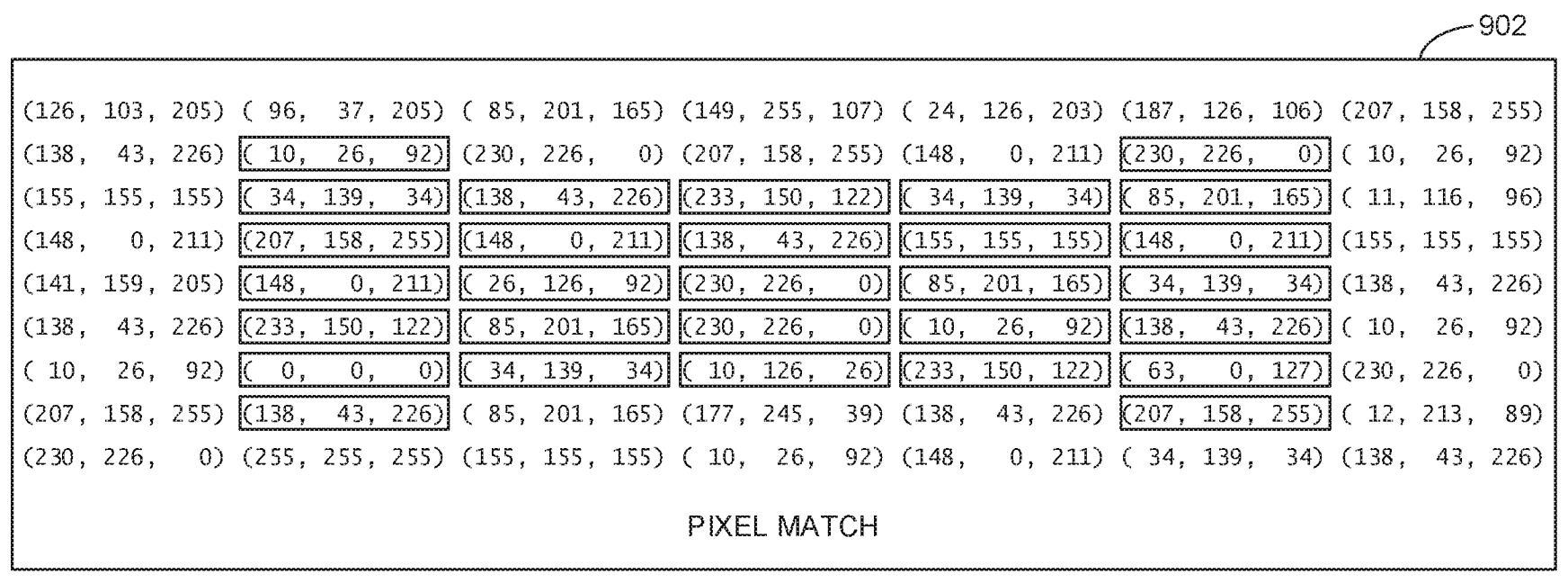

Once the media data is collected, the pixel map generator 204 generates a reference pixel map for the captured media data that is subsequently detected by the pixel map detector 304, as shown in FIG. 4A (block 506). At block 508, the field of view detector 306 detects a field of view for the captured media data based on the field of view generated by the VR renderer 206 at block 506, as shown in FIG. 4B. The pixel matcher 308 compares the field of view from the field of view detector 306 to the pixel map from the pixel map detector 304 and determines a pixel match, as shown in FIG. 9 (block 510). The view edge determiner 310 compares the edge of the pixel match from the pixel matcher 308 to a threshold at block 512. Next, it is determined if the view edge meets the threshold (block 514). If the view edge does not meet the threshold an indication of unconfined view media is stored (block 516), the indication is sent to the data analyzer 110 and the data analyzer 110 proceeds to transmit media monitoring data (block 520). If the view edge meets the threshold an indication of confined media is stored (block 518), the indication is sent to the data analyzer 110 and the data analyzer 110 proceeds to transmit media monitoring data (block 520).

Figure 6:
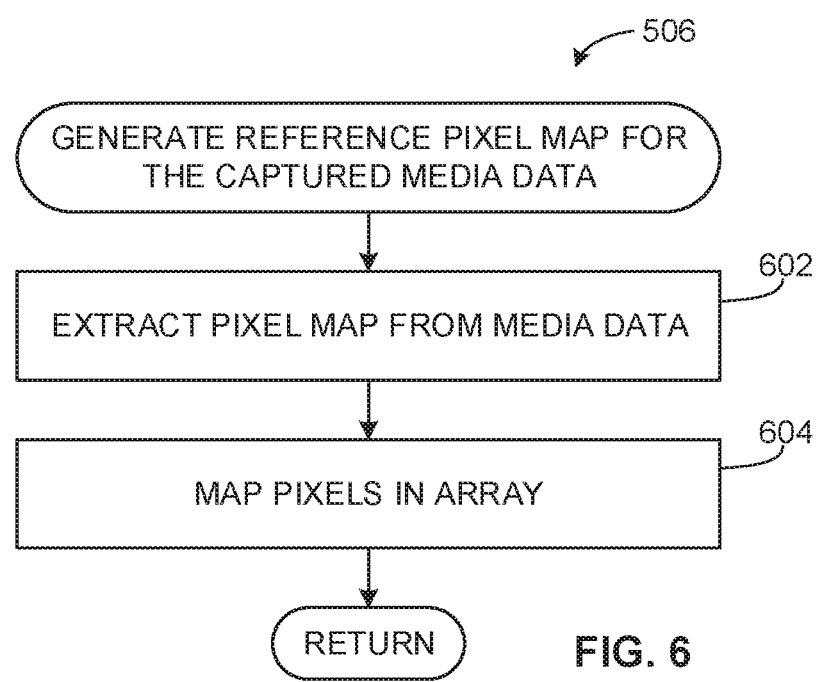
FIG. 6 is a flowchart representative of machine readable instructions that may be executed to implement the example media decoder, the example meter, and the example data analyzer of FIGS. 1, 2 and 3, and to perform the processes of FIG. 5 to generate a reference pixel map for media data.

FIG. 6 illustrates an example of performing the processes of block 506. The program of FIG. 6 begins when the pixel map generator 204 extracts the pixel map from the media data (block 602). The pixel map generator 204 processes the pixel map and maps the pixels in an array (block 604). The process then returns to FIG. 5.

Figure 7:
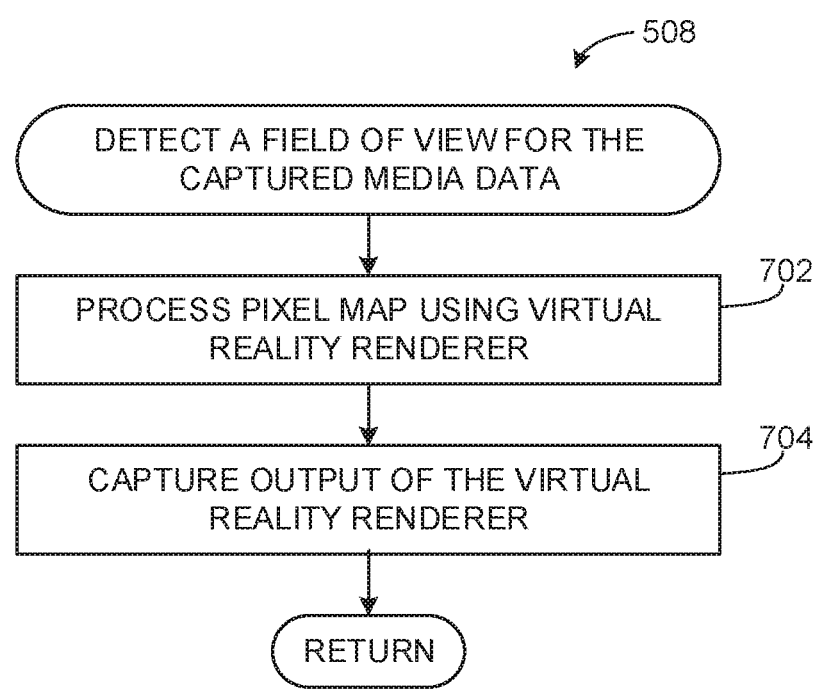
FIG. 7 is a flowchart representative of machine readable instructions that may be executed to implement the example media decoder, the example meter, and the example data analyzer of FIGS. 1, 2 and 3, and to perform the processes of FIG. 5 to detect a field of view for the media data.

FIG. 7 illustrates an example of performing the processes of block 508. The program of FIG. 7 begins when the VR renderer 206 processes the pixel map from the pixel map generator 204 (block 702). The field of view detector 306 captures the output of the VR renderer 206 (i.e., the field of view 208) (block 704). The process then returns to FIG. 5.

Figure 8:
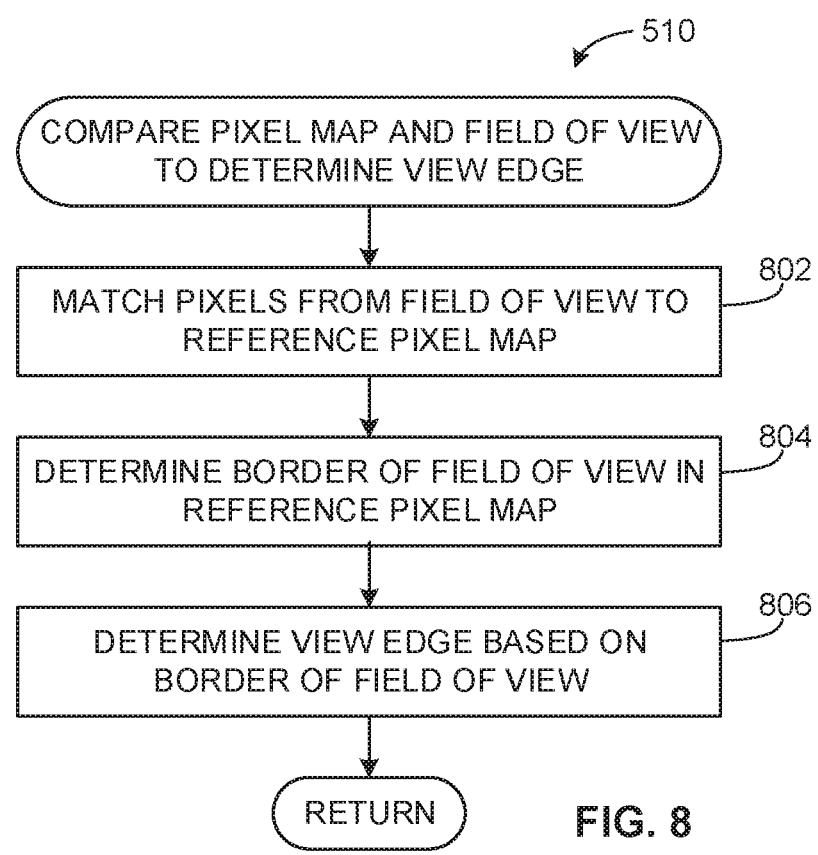
FIG. 8 is a flowchart representative of machine readable instructions that may be executed to implement the example media decoder, the example meter, and the example data analyzer of FIGS. 1, 2 and 3 and to perform the processes of FIG. 5 to determine a view edge for the media data.

FIG. 8 illustrates an example of performing the processes of block 510. The program of FIG. 8 begins when the pixel matcher 308 matches the pixels from the field of view 404 to the pixel map 402 (block 802). The view edge determiner 310 determines a border for the field of view 404 in the pixel map 402 (e.g., the pixel match 902) (block 804). The view edge determiner 310 determines a view edge based on the border of the field of view (block 806) as shown in FIG. 9. The process then returns to FIG. 5.

FIG. 9 is an example representation of a pixel match 902 based on the comparison between the pixel map 402 and the field of view 404 of FIGS. 4A and 4B that may be generated by the example pixel matcher 308 of FIG. 3.

Figure 10:
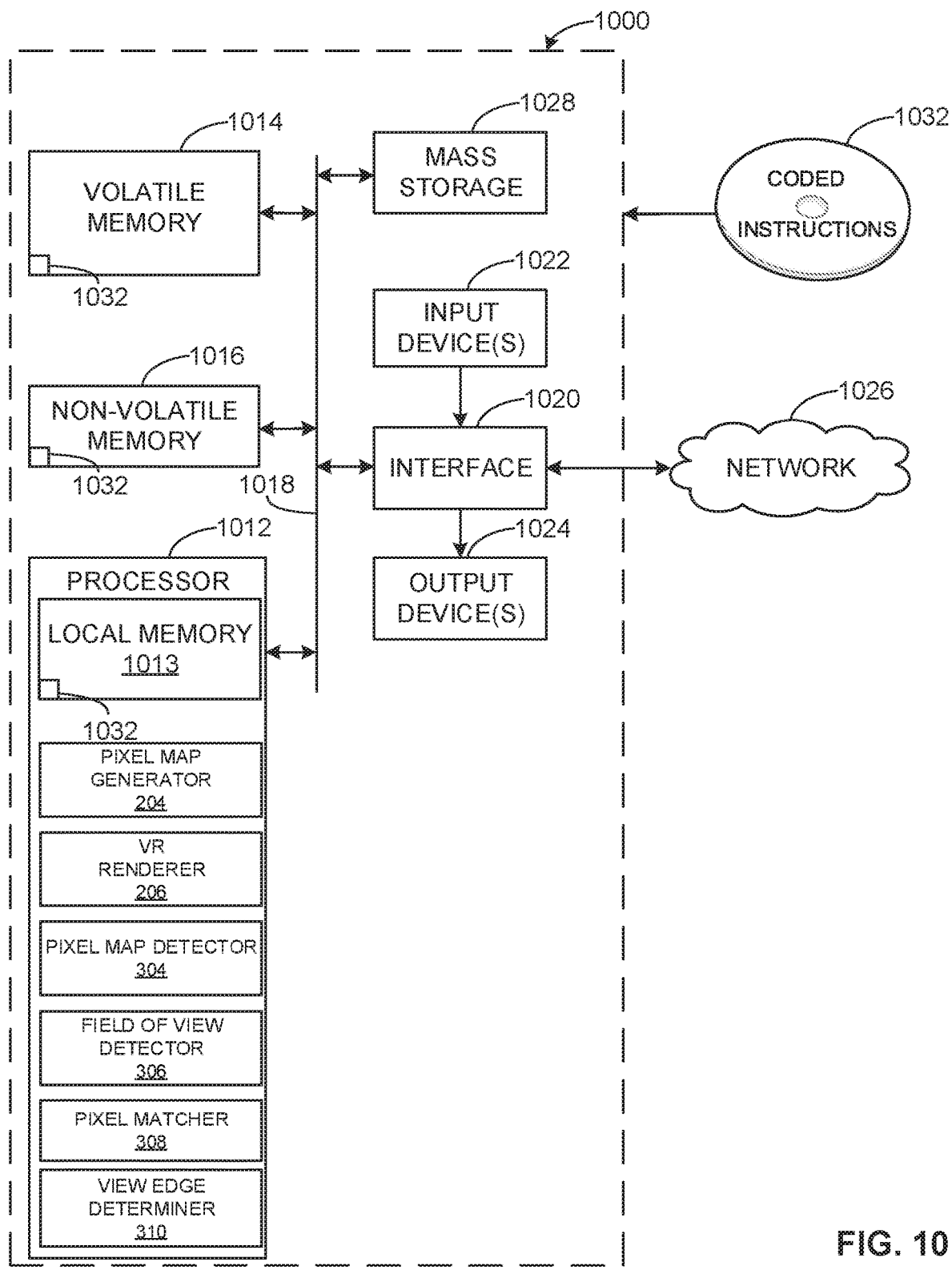
FIG. 10 is a block diagram of an example processor platform capable of executing the instructions of FIGS. 5, 6, 7 and/or 8 to implement the example media decoder, the example meter and the example data analyzer of FIGS. 1, 2 and 3.

FIG. 10 is a block diagram of an example processor platform 1000 capable of executing the instructions of FIGS. 5, 6, 7, and 8 to implement the media decoder 107, the meter 108, and the data analyzer 110 of FIGS. 1, 2, and 3. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 5, 6, 7, and 8 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture detect unconfined view media. Currently, unconfined view media (e.g., 360-degree view media) files are large and difficult to identify/process with normal media file processing techniques. The disclosed methods allow the detection of such media so that it can be handled properly for capturing and categorization. Additionally, the identification of unconfined media is beneficial for advertisement detection and placement. In particular, advertisers will be able to locate the field of view for a specific video and place/identify specific advertisements in the field of view.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for detecting unconfined view media, the apparatus comprising:
 a pixel map generator to generate, by executing an instruction with a processor, a reference pixel map for media data by extracting metadata corresponding to attributes of the media data and mapping pixel data of the media data in an array based on the metadata, the reference pixel map including coordinate locations of respective pixels for a first portion of the media data in an unrendered state, the unrendered state representative of coordinate locations of the respective pixels prior to being displayed on a presentation device;
 a field of view detector to detect, by executing an instruction with the processor, a field of view for a presentation of the media data, the field of view including coordinate locations of the respective pixels for the first portion of the media data in a rendered state, the rendered state representative of coordinate locations of the respective pixels while being displayed on the presentation device; and
 a view edge determiner to determine, by executing an instruction with the processor, a first view edge based on matching the coordinate locations of the respective pixels of the field of view to the coordinate locations of the respective pixels of the reference pixel map and that the media data corresponds to unconfined view media based on the first view edge.

2. The apparatus of claim 1, wherein the pixel map generator captures the media data from a media source, the media data including the metadata and the pixel data.

3. The apparatus of claim 1, further including a virtual reality renderer to extract metadata identifying one or more attributes of the media data, extract display information corresponding to attributes of a presentation device to present the media data, and process the reference pixel map based on the metadata and the display information to generate a field of view for presentation at the presentation device.

4. The apparatus of claim 3, wherein the field of view detector detects the field of view generated by the virtual reality renderer.

5. The apparatus of claim 1, further including a pixel matcher to match pixels of the field of view to pixels of the reference pixel map.

6. The apparatus of claim 1, wherein the view edge determiner:
  determines the first view edge from a border of the field of view subsequent identifying a match in the reference pixel map; and
  determines that the media data corresponds to unconfined view media when the first view edge exceeds a threshold.

7. The apparatus of claim 1, further including a data analyzer to generate media monitoring data based on the determination of unconfined view media.

8. The apparatus of claim 7, wherein the data analyzer is to transmit the media monitoring data to a collection facility.

9. A method of detecting unconfined view media, the method comprising:
  generating, by executing an instruction with a processor, a reference pixel map for media data by extracting metadata corresponding to attributes of the media data and mapping pixel data of the media data in an array based on the metadata, the reference pixel map including coordinate locations of respective pixels for a first portion of the media data in an unrendered state, the unrendered state representative of coordinate locations of the respective pixels prior to being displayed on a presentation device;
  detecting, by executing an instruction with the processor, a field of view for a presentation of the media data, the field of view including coordinate locations of the respective pixels for the first portion of the media data in a rendered state, the rendered state representative of coordinate locations of the respective pixels while being displayed on the presentation device;
  determining, by executing an instruction with the processor, a first view edge based on matching the coordinate locations of the respective pixels of the field of view to the coordinate locations of the respective pixels of the reference pixel map; and
  determining, by executing an instruction with the processor, that the media data corresponds to unconfined view media based on the first view edge.

10. The method of claim 9, wherein a processor executed on a media device captures the media data from a media source, the media data including the metadata and the pixel data.

11. The method of claim 9, further including processing the reference pixel map with a virtual reality renderer to generate a field of view for presentation.

12. The method of claim 11, wherein detecting the field of view for the presentation of the media data includes detecting the field of view generated by the virtual reality renderer.

13. The method of claim 9, further including matching pixels of the field of view to pixels of the reference pixel map.

14. The method of claim 9, further including:
  determining the first view edge from a border of the field of view subsequent identifying a match in the reference pixel map; and
  determining that the media data corresponds to unconfined view media when the first view edge exceeds a threshold.

15. The method of claim 14, further including generating media monitoring data based on the determination of unconfined view media and transmitting the media monitoring data to a collection facility.

16. A non-transitory computer-readable medium comprising instructions that, when executed, cause a processor to, at least:
  generate a reference pixel map for media data by extracting metadata corresponding to attributes of the media data and mapping pixel data of the media data in an array based on the metadata, the reference pixel map including coordinate locations of respective pixels for a first portion of the media data in an unrendered state, the unrendered state representative of coordinate locations of the respective pixels prior to being displayed on a presentation device;
  detect a field of view for a presentation of the media data, the field of view including coordinate locations of the respective pixels for the first portion of the media data in a rendered state, the rendered state representative of coordinate locations of the respective pixels while being displayed on the presentation device;
  determine a first view edge based on matching the coordinate locations of the respective pixels of the field of view to the coordinate locations of the respective pixels of the reference pixel map; and
  determine that the media data corresponds to unconfined view media based on the first view edge.

17. The non-transitory computer readable medium as defined in claim 16, wherein the instructions, when executed, further cause the processor to process the reference pixel map with a virtual reality renderer to generate a field of view for presentation.

18. The non-transitory computer readable medium as defined in claim 16, wherein the instructions, when executed, further cause the processor to match pixels of the field of view to pixels of the reference pixel map.

19. The non-transitory computer readable medium as defined in claim 16, wherein the instructions, when executed, further cause the processor to:
  determine the first view edge from a border of the field of view subsequent identifying a match in the reference pixel map; and
  determine that the media data corresponds to unconfined view media when the first view edge exceeds a threshold.

20. The non-transitory computer readable medium as defined in claim 19, wherein the instructions, when executed, further cause the processor to generate media monitoring data based on the determination of unconfined view media and transmit the media monitoring data to a collection facility.

* * * * *